June 22, 1971 H. A. McMASTER 3,586,492

GLASS SHEET SUPPORT FOR A PRESS SHAPING APPARATUS

Filed Nov. 4, 1968

INVENTOR.
Harold A. McMaster
BY
Barnard, McGlynn & Reising
ATTORNEYS

United States Patent Office 3,586,492

Patented June 22, 1971

3,586,492

GLASS SHEET SUPPORT FOR A PRESS SHAPING APPARATUS

Harold A. McMaster, Woodville, Ohio, assignor to Permaglass, Inc., Millbury, Ohio Filed Nov. 4, 1968, Ser. No. 773,175
Int. Cl. C03b *23/02*
U.S. Cl. 65—287 4 Claims

ABSTRACT OF THE DISCLOSURE

A method and apparatus for treating a heated sheet of glass by supporting the sheet with an endless ring frame having teeth with elongated points thereon by contacting one face or surface of the sheet adjacent the periphery with the points of the teeth. In the preferred embodiment, a wire mesh screen is disposed over the elongated points for contacting the sheet.

This invention relates broadly to the bending or curving and subsequent tempering or cooling of sheets of glass. One method in which sheets of glass are curved is to dispose a flat sheet of glass on a metal bending mold having shaping surfaces to conform to the desired curvature of the sheet of glass and heating the sheet to a softening temperature so that the sheet sags under the force of gravity into conformity with the shaping surfaces of the mold. Normally the molds are moved through a furnace so that the sheets of glass are heated and when the sheets have reached the desired temperature and the desired curvature, the bending molds are moved into a cool environment where the sheets are cooled so as to be annealed or tempered. Another method of curving a sheet of glass is to heat a flat sheet of glass to the desired temperature and thereafter press the sheet of glass against a mold having the desired curved configuration. Normally this is accomplished with an endless ring frame which engages one surface of the sheet of glass about the periphery thereof. While the bent sheet of glass is supported on the frame, it is cooled or annealed or tempered.

One problem associated with both of these curving methods is that of chill cracking of the sheets of glass at the point of contact with the metal bending molds or the endless ring frame.

The bending molds normally pass through a furnace and into a blasthead where they are subjected to cool blasts of air and then are returned to re-enter the furnace with a new piece of glass disposed thereon. As the bending mold moves through the furnace its temperature remains cooler than that of the sheet of glass disposed thereon and, as the sheet sags under the force of gravity and contacts the mold, a high heat transfer occurs between the glass and the mold to cool the glass at such contact points whereupon sufficient stresses are set up in the glass to cause cracking.

In the method of curving a sheet of glass by supporting it on an endless ring frame and pressing it against a mold surface and thereafter moving the sheet into a blasthead, the frame upon which the glass is supported spends a major portion of the cycle in the blasthead where it is subjected to cool blasts of air. When the frame moves to the bending or curving station where it engages a hot sheet of glass to press the glass against the mold surface, it is substantially cooler than the sheet of glass, thereby causing a high transfer of heat from the glass to the frame which in turn sets up sufficient stresses in the glass to cause cracking.

Accordingly, it is an object and feature of this invention to provide an improved method and apparatus wherein heated sheets of material such as glass are supported by engaging an area on one surface of the sheet by contact with the sheet in a percentage of that area which is low enough to prevent sufficient heat transfer from the sheet to cause cracking thereof.

In correlation with the foregoing object and feature, another object and feature of this invention is to contact the sheet with a plurality of sheet contacting areas which are spaced from one another.

In correlation with the foregoing objects and features of this invention, another object and feature of this invention is to support a sheet of glass on an endless ring frame having a plurality of pointed teeth.

In correlation with the foregoing objects and features, it is another object and feature of this invention to utilize an endless ring frame having teeth with elongated points disposed thereon and wires disposed over each of the points of the teeth for engaging the sheet of glass.

Other objects and attendant advantages of the present invention will be readily appreciated as the same becomes better understood by reference to the following detailed description when considered in connection with the accompanying drawings wherein.

Figure 1:
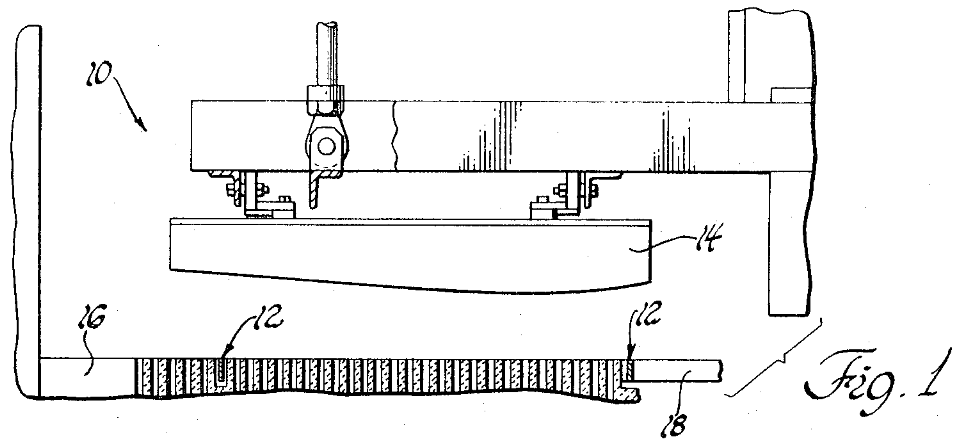
FIG. 1 is a fragmentary elevational view, partly in cross section, disclosing a preferred embodiment of the instant invention.

Referring now to the drawings, wherein like numerals indicate like or corresponding parts throughout the several views, an apparatus for treating heated sheet material such as glass is generally shown at 10. Although it is to be understood that the instant invention is also applicable to other situations wherein a heated sheet of glass is contacted on one surface, such as in a metal bending mold where the sheet of glass is heated and allowed to sag under the force of gravity to the desired curvature, it will be described and illustrated herein a connection with an endlesss ring frame 12 which presses a heated sheet of glass against the shaping mold 14.

The apparatus 10 includes a bed 16 which has passages therein so that gases may flow through the bed for supporting a sheet of glass over the bed. The endless ring frame 12 is normally recessed below the surface of the bed as illustrated in FIG. 1. A sheet of glass floats over the bed 16 and there is included means including the arms 18 for moving the frame upwardly to engage the sheet and to press the sheet against the shaping mold 14. Thereafter, the frame 12 is moved laterally into a blasthead where the sheet of glass is subjected to cooler gases for tempering. In some instances, instead of moving the sheet to an adjacent blasthead, it may be desirable to subject the sheet of glass to cooling gases while disposed on the frame 12 between the bed 16 and the shaping mold 14. A more detailed description of such an apparatus may be had by referring to copending application Ser. No. 691,326, filed Dec. 18, 1967, in the name of Harold A. McMaster and assigned to the assignee of the instant invention.

The endless ring frame 12 defines a sheet engaging means for engaging a sheet of glass over an area thereof which is disposed on one face or surface of the sheet. In other words, the frame 12 engages the lower surface of a sheet of glass in an area defined by a strip extending around the lower surface in a loop adjacent the periphery of the sheet of glass. As will become more clear hereinafter, however, the sheet engaging means as defined by the frame 12 includes an aggregate sheet contacting surface which contacts less than twenty percent (20%) of this area which defines the loop or band about the periphery of the sheet of glass on the bottom surface thereof.

Figure 2:
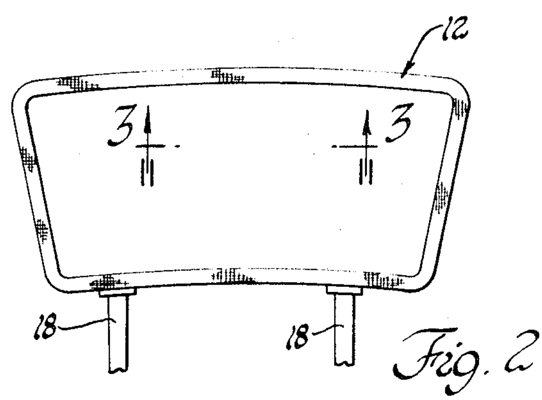
FIG. 2 is a fragmentary plan view of a preferred embodiment of an endless ring frame constructed in accordance with the instant invention.

The frame 12 has a plurality of teeth 20 disposed thereon. The teeth 20 are pointed with the points of each tooth being elongated to define a linear sheet contacting area 22 along each tooth. Each linear sheet contacting area or elongated point 22 is generally parallel to adjacent linear sheet contacting points; however, they are not exactly parallel due to the curvature of the frame as illustrated in FIG. 2.

Figure 3:
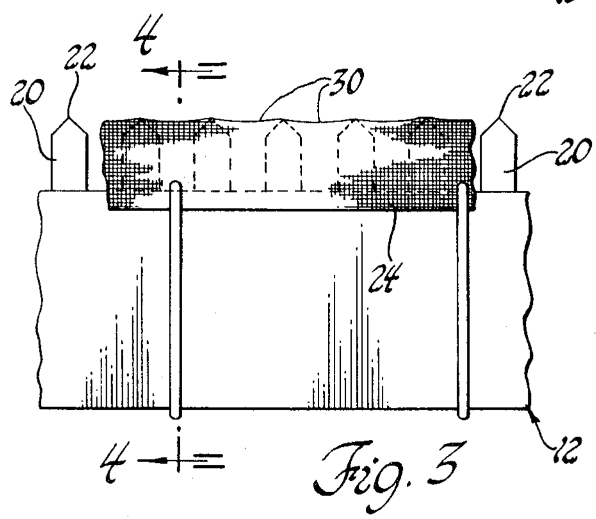
FIG. 3 is an enlarged fragmentary cross sectional view taken substantially along line 3—3 of FIG. 2.
Figure 4:
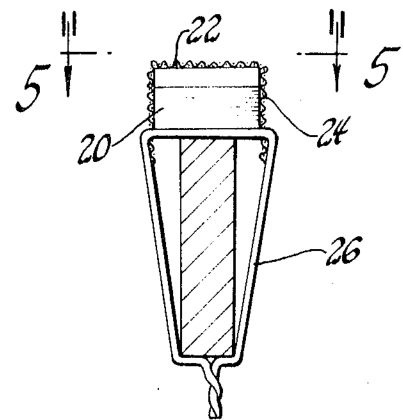
FIG. 4 is a cross sectional view taken substantially along line 4—4 of FIG. 3.
Figure 5:
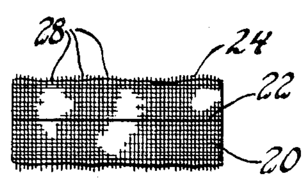
FIG. 5 is an enlarged fragmentary top view taken substantially along line 5—5 of FIG. 4.

In the preferred embodiment of the invention, a stainless steel wire mesh screen 24 is disposed on the frame and held in position by the wires 26. As best illustrated in FIG. 5, the wire mesh screen includes a plurality of wires 28 which are disposed transversely across each linear point 22 and define sheet contacting areas at the positions where they cross the linear points 22. Also, as illustrated in FIG. 3 at 30, the wires 28 and the cross wires of the wire mesh screen extend downwardly into the spaces between the linear points 22 so as not to contact a sheet of glass when the portions of the wires defining the sheet contacting areas over the linear points 22 are in contact with the sheet of glass.

Although the use of the wire mesh screen disposed over the elongated teeth has been found to be extremely satisfactory, the engagement of a sheet of glass with the teeth 22 absent the wire mesh screen has also proven very satisfactory when the teeth are sufficiently sharp.

The linear points 22 on the teeth 20 therefore define a plurality of sheet contacting areas which are spaced from one another and, when the wire mesh screen 30 is disposed over the teeth 20, the plurality of sheet contacting areas are defined by the wires 28 in the portions thereof immediately above the linear points 22. When the linear points 22 contact the sheet of glass, there results a linear or line contact with the sheet of glass whereas the sheet contacting areas resulting from the use of the wire mesh screen are smaller areas which are not so elongated. It has been found in the employment of this invention that the chill cracking of a sheet of glass can be prevented when the sheet contacting area is not greater than one sixteenth of an inch (1/16") in at least one direction thereacross. In other words, the width of the line contact resulting from the linear point 22 contacting a sheet of glass should not be greater than one sixteenth of an inch and the distance across any contact area between one of the wires 28 and a sheet of glass should not be greater than one sixteenth of an inch. Additionally, if a sheet of glass is sufficiently heated, the sheet, when contacting linear points 22, could sag between linear points 22 under the right conditions. Thus, in accordance with the instant invention, the distance between sheet contacting areas such as the linear points 22 should not be greater than four (4) times the thickness of the sheet of glass to be supported thereby.

The instant invention therefore sets forth a method of treating a heated sheet of glass wherein the sheet of glass is supported by engaging in an area which is disposed on one surface of the sheet and contacting the sheet in less than twenty percent (20%) of that area on the surface. In other words, the area of the sheet of glass which is to be engaged is defined by the area on the glass covered by the endless ring frame 12 but the sheet of glass is contacted in less than twenty percent (20%) of that area to prevent sufficient heat transfer from the sheet of glass to the frame to allow chill cracking of the glass.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An apparatus for supporting sheets of glass while heat treating the sheets comprising; an endless ring frame for engaging a surface of a sheet, a plurality of teeth spaced from one another about said frame, said teeth being pointed with the points being elongated to define linear areas, said linear areas being generally parallel to one another about the frame, said linear areas defining less than 20% of the area covered by said endless ring frame.

2. An apparatus as set forth in claim 1 including a wire mesh screen disposed on said frame and over said points of said teeth.

3. An apparatus as set forth in claim 2 wherein said screen sags downwardly into the spaces between said points so as not to contact a sheet engaging said screen over said points.

4. An apparatus as set forth in claim 2 including a shaping mold and means for moving said frame adjacent said mold to press a sheet thereagainst to curve the sheet.

References Cited

UNITED STATES PATENTS

| | | | |
|---|---|---|---|
| 2,261,023 | 10/1941 | Galey | 65—107 |
| 3,310,273 | 3/1967 | Seymour | 65—287X |
| 3,468,645 | 9/1969 | McMaster et al. | 65—104 |

FOREIGN PATENTS

| | | | |
|---|---|---|---|
| 505,222 | 12/1954 | Italy | 65—107 |

ARTHUR D. KELLOGG, Primary Examiner

U.S. Cl. X.R.

65—104, 273